US008794906B1

(12) United States Patent
Liang

(10) Patent No.: US 8,794,906 B1
(45) Date of Patent: Aug. 5, 2014

(54) TURBINE STATOR VANE WITH ENDWALL COOLING

(75) Inventor: George Liang, Palm City, FL (US)

(73) Assignee: Florida Turbine Technologies, Inc., Jupiter, FL (US)

( * ) Notice: Subject to any disclaimer, the term of this patent is extended or adjusted under 35 U.S.C. 154(b) by 585 days.

(21) Appl. No.: 12/820,165

(22) Filed: Jun. 22, 2010

(51) Int. Cl.
*F01D 5/14* (2006.01)
*F03D 11/00* (2006.01)

(52) U.S. Cl.
USPC ........................................ 415/115; 416/97 R

(58) Field of Classification Search
CPC ............ F01D 5/187; F01D 5/186; F01D 5/22
USPC ..... 415/115, 116, 191; 416/96 R, 97 A, 97 R, 416/193 A
See application file for complete search history.

(56) References Cited

U.S. PATENT DOCUMENTS 7,097,417 B2 * 8/2006 Liang ............................ 415/115
7,621,718 B1 * 11/2009 Liang ............................ 415/115

* cited by examiner

*Primary Examiner* — Edward Look
*Assistant Examiner* — Christopher J Hargitt
(74) *Attorney, Agent, or Firm* — John Ryznic

(57) ABSTRACT

A turbine stator vane with an airfoil extending between an inner endwall and an outer endwall, and with a fillet formed between the airfoil and each of the endwalls, and a row of metering impingement and diffusion slots extending around the leading edge region and along the pressure side and suction side of the airfoil just below the fillet that discharges a layer of film cooling air onto the surface of the endwall. A showerhead arrangement of film cooling holes in the leading edge region of the airfoil also discharges a layer of film cooling air toward the leading edge fillet in order to form a double layer of film cooling air from the leading edge region of the endwall.

11 Claims, 6 Drawing Sheets

TURBINE STATOR VANE WITH ENDWALL COOLING

GOVERNMENT LICENSE RIGHTS

None.

CROSS-REFERENCE TO RELATED APPLICATIONS

None.

BACKGROUND OF THE INVENTION

1. Field of the Invention

The present invention relates generally to gas turbine engine, and more specifically to a stator vane with cooling of the vane endwall and fillet region.

2. Description of the Related Art including information disclosed under 37 CFR 1.97 and 1.98

A gas turbine engine, such as a large frame heavy duty industrial gas turbine (IGT) engine, includes a turbine with one or more rows of stator vanes and rotor blades that react with a hot gas stream from a combustor to produce mechanical work. The stator vanes guide the hot gas stream into the adjacent and downstream row of rotor blades. The first stage vanes and blades are exposed to the highest gas stream temperatures and therefore require the most amount of cooling.

A horseshoe vortex flow problem occurs on the vane endwall in the leading edge region from a combination of hot flow core gas radial velocity and static pressure gradient forces that build up at the intersection of the airfoil leading edge and the endwall. As the hot flow core gas enters the turbine with a radial velocity and static pressure profiles, the higher radial velocity or static pressure core gas as an upper span height of the hot flow path decelerates to zero at the surface of the radial boundary wall of the flow path and creates a region of stagnant flow at an interface of the airfoil and the endwall region.

As shown in FIG. 1, the hot gas flow profile 9 is shown. The resulting forces drive the stagnated flow 8 that occurs along the airfoil leading edge towards the region of lower pressure at an intersection of the airfoil and endwall. This secondary flow rolls away from the airfoil leading edge and then flows upstream along the endwall against the hot core gas flow as seen in FIG. 2 which shows the forward stagnated flow 11. As a result, the stagnated flow 11 forces acting on the hot core gas flow and radial transfer of hot core gas flow from the upper airfoil space toward close proximity to the endwall to create a high heat transfer coefficient and a high gas temperature region at the intersection location. FIG. 3 shows the high heat load condition or over-temperature at the airfoil horseshoe vortex region 13 in which the erosion of the TBC and endwall materials occurs due to this stagnant hot gas flow.

In the prior art stator vane, film cooling air is injected at discrete location along the horseshoe vortex region 15 (horseshoe because it is shaped like a horseshoe around the leading edge on the endwall, see FIG. 4) to provide for cooling to this region of the vane. The hot gas flow 15 is shown in FIG. 4. There are many problems associated with this prior art method for cooling this region of the vane. A high film effectiveness level is difficult to establish and maintain in the high turbulent environment and high pressure variation region such as the horseshoe vortex region 15. Film cooling is very sensitive to pressure gradient. The mainstream pressure variation is very high at the horseshoe vortex location. The spacing between the discrete film cooling holes and areas immediately downstream of the spacing is exposed to less or no film cooling air. Thus, these areas are more susceptible to thermal degradation and over-temperature.

BRIEF SUMMARY OF THE INVENTION

A high heat transfer coefficient and high gas temperature region as well as the high thermal gradient problems associated with the vane endwall leading edge cooling can be achieved using the new and effective cooling geometry of the present invention into the prior art vane endwall cooling design. The vane includes a multiple metering and diffusion submerged cooling slot construction for the vane endwall leading edge cooling in which the submerged cooling slots extend along both sides of the vane airfoil.

The submerged metering diffusion and impingement cooling slots include a metering cooling flow entrance section in conjunction with submerged diffusion exit slots. A fan shaped slot with two different directions of diffusion is disposed in the endwall along the airfoil leading edge and endwall intersection location. The fan shaped slots are constructed with the airfoil leading edge diameter extended below the boundary wall. The fan shaped slot depth is gradually reduced as the slot wraps around the leading edge diameter in the chordwise direction as well as away from the airfoil leading edge zone. This forms a 3-Dimensional shaped diffusion slot. Since the size of the horseshoe vortex is a strong function of the airfoil leading edge diameter, the fan shaped slot depth and width geometry will be determined based on each individual turbine vane airfoil leading edge diameter as well as the turbine inlet conditions.

The multiple metering diffusion submerged cooling slot is constructed in a single or small modular formation. Individual modules are designed based on the airfoil gas side pressure distribution in the streamwise direction. In addition, each individual module can be designed based on the airfoil local external heat load to achieve a desired local metal temperature. These individual small modules can be constructed as one metering hole with one diffusion slot or two metering holes in conjunction with larger diffusion slot geometry along the endwall leading edge section.

Within the fan shaped diffusion slot, film cooling flow is discharged in a direction aligned with the hot gas flow passing over the slot. Since the fan shaped diffusion slot is formed below the vane fillet and at an increased chordwise spreading length to diffuse or slow down the secondary hot gas flow, it forms an improved film layer for the injected cooling air from the diffusion slots. Besides than film cooling slots at the bottom of the vane fillet region, multiple rows of showerhead film cooling holes pointed at the endwall direction are used around the airfoil leading edge periphery to inject the film cooling air to form a film sub-layer for the baffle airfoil leading edge from the downward draft of the hot core gas stream.

DETAILED DESCRIPTION OF THE INVENTION

A turbine stator vane has an airfoil section that extends between an inner endwall and an outer endwall to form a flow path for a hot gas stream. A fillet region forms a curved transition between the airfoil and the endwalls that wraps around the airfoil leading edge and extends along the pressure side (P/S) and suction side (S/S) of the airfoil toward the trailing edge of the airfoil. To prevent the over-temperature problems of the prior art around the horseshoe region of the endwalls in the leading edge region, the present invention includes a row of metering diffusion and impingement cooling slots that are formed below the fillet and wrap around the leading edge of the airfoil and extend along both sides of the airfoil to discharge a film layer of cooling air onto the endwall surfaces.

Figure 1:
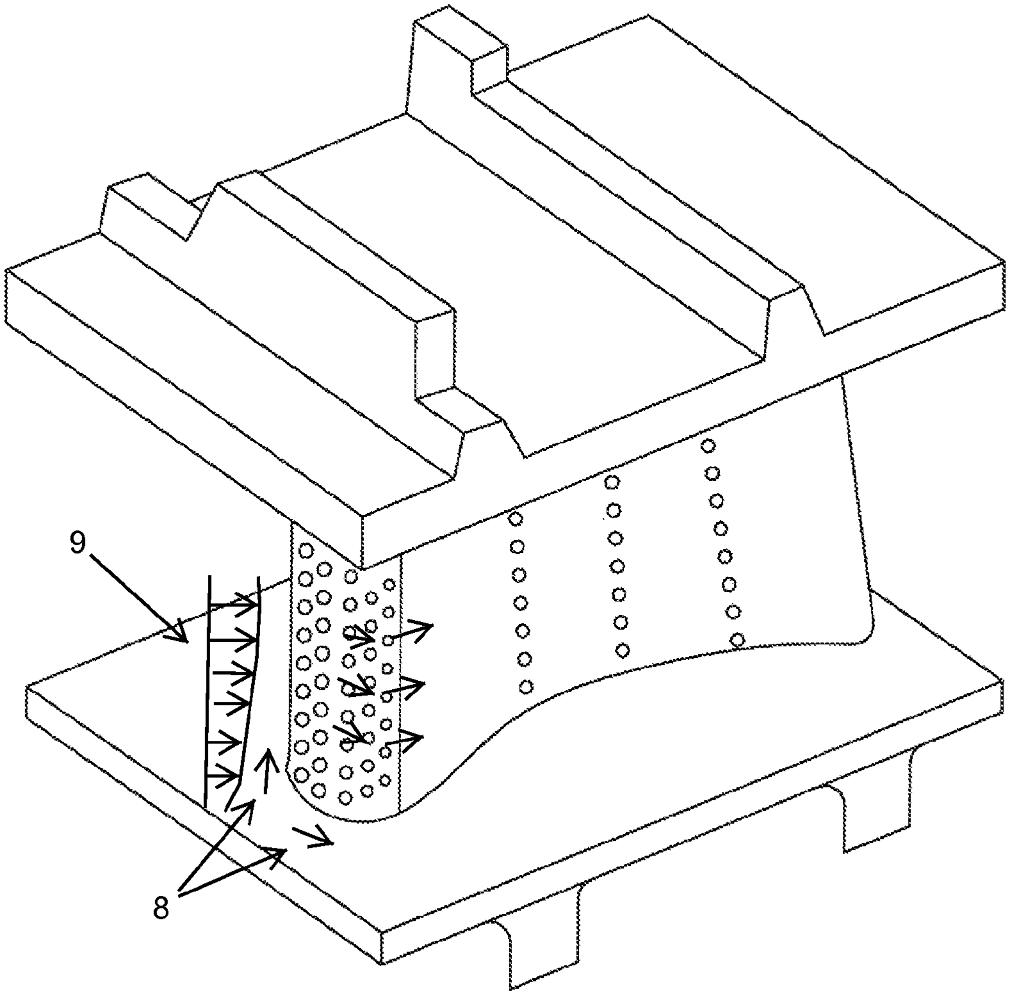
Fig 1 prior art
FIG. 1 shows a schematic view of a stator vane assembly with hot gas stream flow and a stagnation flow around the leading edge regions of the endwalls.
Figure 2:
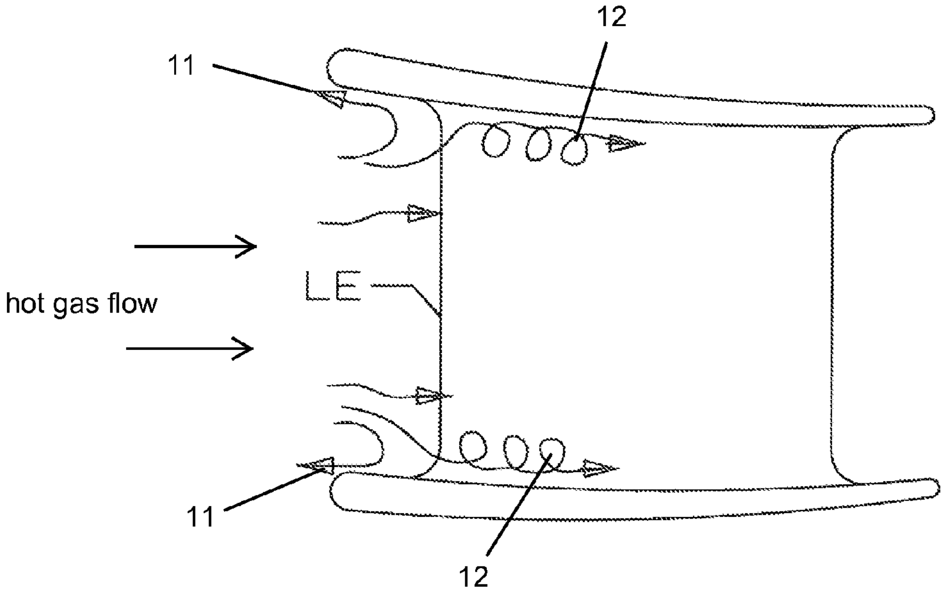
FIG. 2 shows a side view of a stator vane with a secondary flow formation in the leading edge region of the endwalls.
Figure 3:
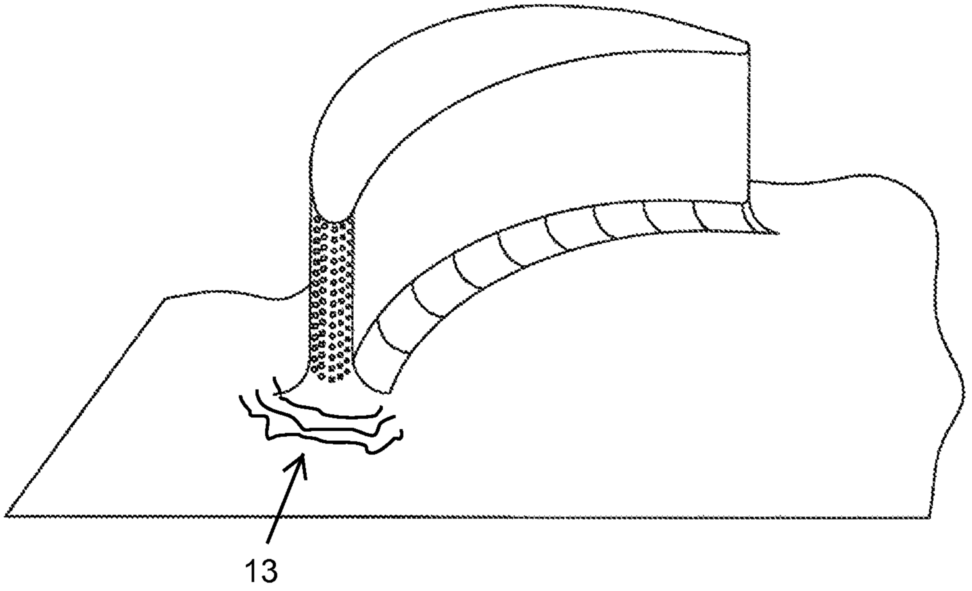
Fig 3 prior art
FIG. 3 shows a schematic view of a vane with the horseshoe vortex region subject to a high heat load due to the stagnation flow.
Figure 4:
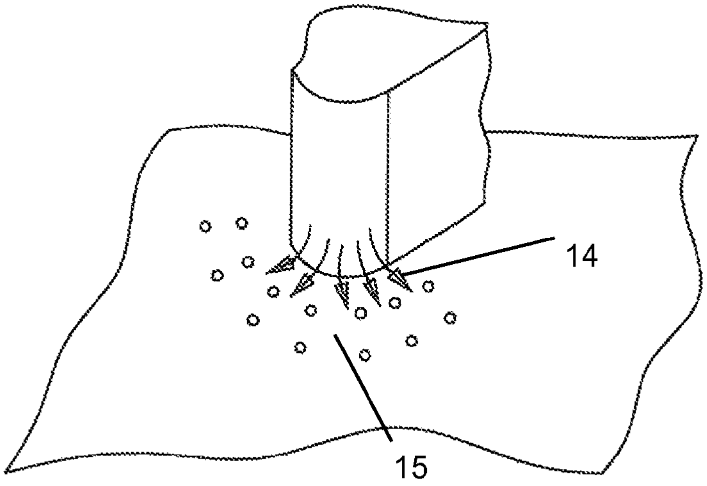
Fig 4 prior art
FIG. 4 shows a prior art stator vane with film cooling holes on the endwall in the leading edge region.
Figure 5:
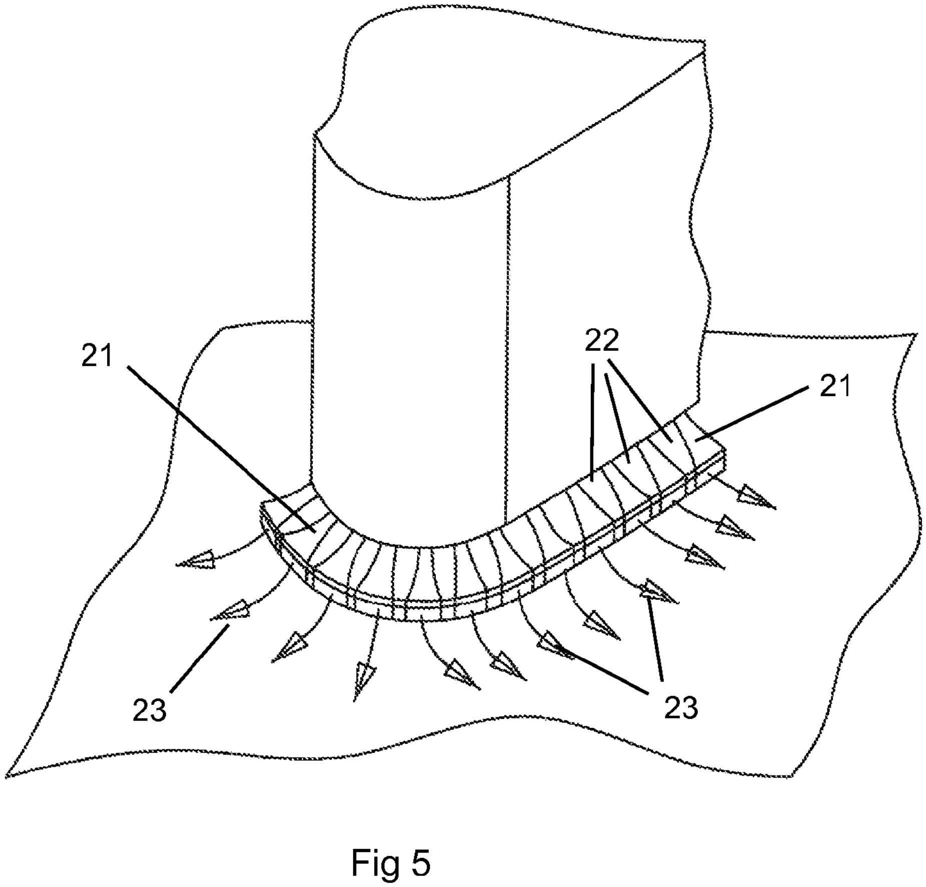
FIG. 5 shows a schematic view of the vane of the present invention with the multiple metering diffusion and impingement cooling slots extending around the leading edge and along both sides of the airfoil fillet regions.

FIG. 5 shows a view of the airfoil and inner endwall of a stator vane with these slots. The fillet 21 extends around the airfoil leading edge and extends along the P/S and S/S sides of the airfoil ending at the trailing edge. The diffusion exit slots 23 are formed below the fillet and discharge the film cooling air onto the endwall surface in a direction substantially parallel to the endwall surface. The same arrangement will also be used on the outer endwall. Each diffusion exit slot 23 is separated by an extended rib 22.

Figure 6:
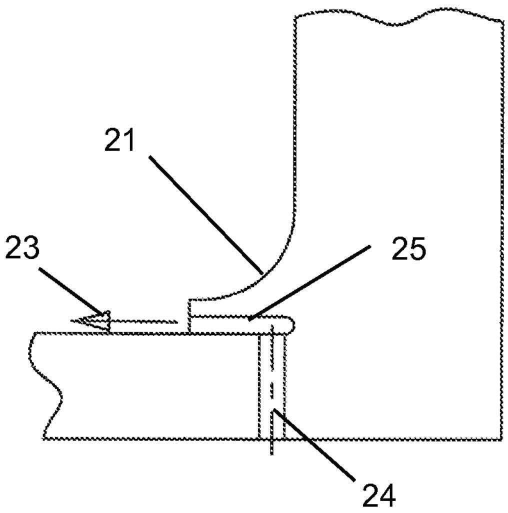
FIG. 6 shows a cross section side view of one of the multiple metering diffusion and impingement cooling slots in the vane of the present invention.

FIG. 6 shows a more detailed view of one of the discharge exit slots 23 and the remaining structure associated with the slot 23. One or two metering holes 24 supply cooling air to the slot 23 and meter the cooling air to the slot 23. A diffusion chamber 25 is formed substantially perpendicular to the metering hole 24 so that impingement cooling will occur against the inner surface of the diffusion chamber 25. The cooling air then flows along the diffusion chamber 25 and is discharged out through the diffusion exit slot 23 as a layer of film cooling air onto the surface of the endwall at substantially a parallel direction to the endwall surface. As seen in FIG. 6, the diffusion exit slot 23 is formed as a submerged film cooling slot because it is located below the fillet 21 and opens onto the side stepped surface that extends toward the endwall surface and that is substantially perpendicular to the edge of the fillet surface.

Figure 7:
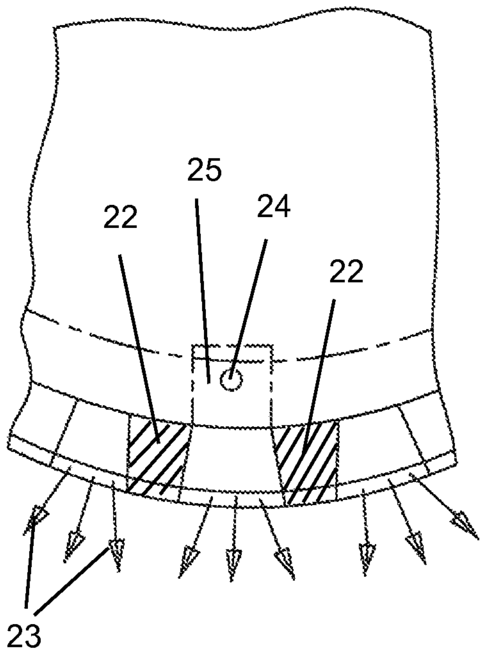
FIG. 7 shows a detailed view of a fan shaped cooling slot used in the vane of the present invention.
Figure 8:
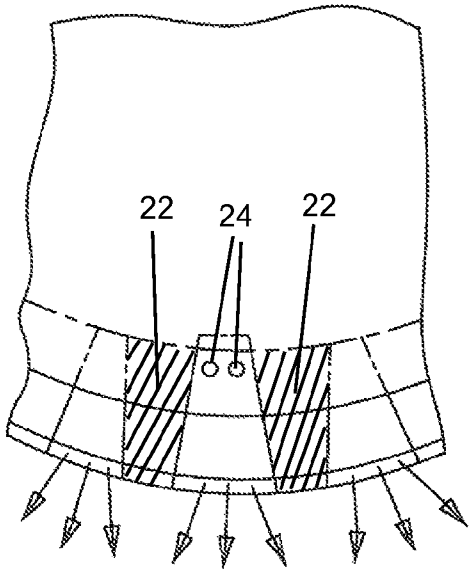
FIG. 8 shows a detailed view of the fan shaped cooling slot but with two metering holes for each slot used in the vane of the present invention.
Figure 9:
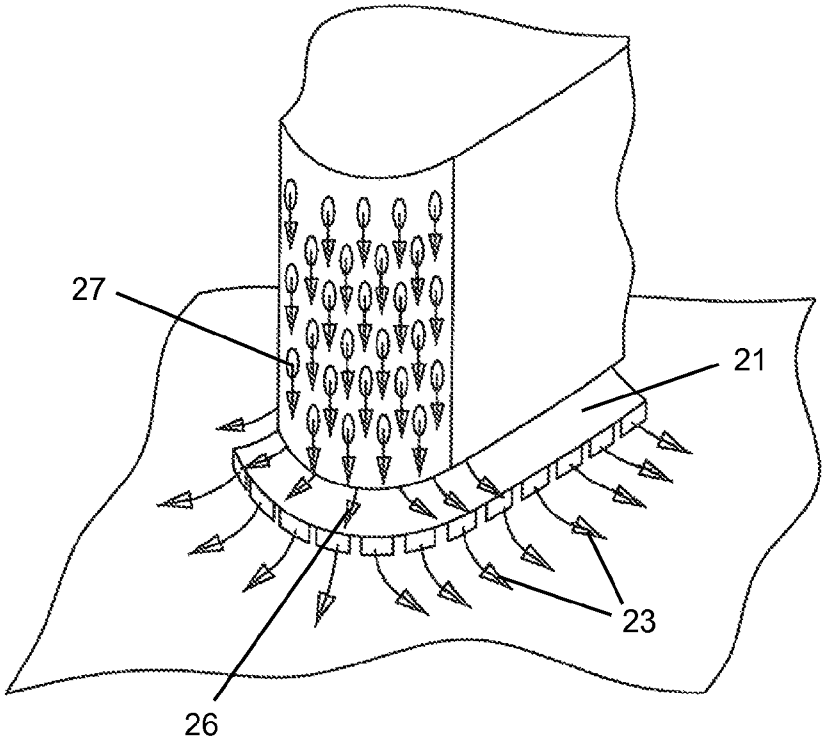
FIG. 9 shows a schematic view of the vane of the present invention from the leading edge view with two layers of film cooling.

FIG. 7 shows a detailed view of the structure of the fan shaped diffusion exit slots 23. Each diffusion exit slot 23 is formed by two ribs 22 that have side walls that slant outward in a direction of the cooling air flow. One or two metering holes 24 open into the diffusion chamber 25. FIG. 8 shows the embodiment with two metering holes 24. As seen in FIG. 9, the arrangement of metering diffusion and impingement cooling slots extend around the leading edge and along the P/S and S/S walls of the airfoil to provide a layer of film cooling air onto the endwall surfaces. A second layer of film cooling air is supplied through the film cooling holes that form the showerhead arrangement on the leading edge region of the airfoil and discharge downward or toward the endwall surfaces in the leading edge region. The upper endwall would be formed similar to the lower endwall structure shown in FIG. 9. The layer of film cooling air from the showerhead film cooling holes 27 will flow down and over the fillet surface and then merge onto the top of the film layer from the diffusion exit slows 23. This is formed only in the leading edge region because of the showerhead film holes 27.

In operation, cooling air is provided by the vane cooling air supply manifold. Cooling air is metered through the metering holes at the entrance section of the multiple metering diffusion submerged film cooling slot. The cooling air is impinged onto the back side of the vane leading edge fillet first and then diffused into the diffusion chamber prior to being discharged from the submerged exit slot 23. An amount of cooling air fed into each cooling slot is sized to closely match the hot gas flow conditions around the vane. The exit for the film cooling slot is submerged from the airfoil fillet surface and provides proper cooling flow spacing for the discharged cooling air versus the down draft hot gas flow to minimize any shear mixing between the discharged film cooling air and the hot gas flow which enhances the cooling effectiveness for the endwall leading edge region. Also, the cooling air is metered and diffused in and along the submerged slot which reduces the film cooling air exit momentum. Coolant penetration into the gas path is therefore minimized, yielding a good build-up of the coolant sub-boundary layer next to the endwall leading edge surface. A better film coverage in the streamwise and chordwise directions for the endwall leading edge region is achieved.

In addition, the exit portion of the multiple metering diffusion submerged cooling slot is constructed with multiple flow surfaces and therefore generates additional convection area for the endwall leading edge region. The combination effects of additional convection cooling plus multiple diffusion film cooling at very high film coverage yields a very high cooling effectiveness and a uniform wall temperature for the vane endwall leading edge region.

Major design features and advantages of the stator vane with the metering diffusion and impingement cooling slots along the fillet over the prior art stator vane with film cooling holes are described below. The fan shaped metering diffusion and impingement cooling slot design provides an improved cooling along the horseshoe vortex region and improved film formation relative to the prior art discrete film cooling hole design.

Film cooling holes on the root of the airfoil leading edge provides convection and film cooling for the airfoil leading edge as well as a baffle of the downdraft hot gas core air for the leading edge fillet region. In combination with the film cooling air discharged from the fan shaped metering diffusion slot provides a double layer of film cooling air for the vane horseshoe vortex region.

The cooling air is retained within the diffusion slot longer and diluted with the hot core gas air. This film cooling air is then discharged out the fan shaped film cooling slot to provide for large film coverage on the endwall surface.

Multiple metering diffusion and impingement cooling slots increase the uniformity of the film cooling and insulates the endwall from the passing hot core gas and thus establishes a durable film cooling at the horseshoe vortex region.

The multiple metering diffusion film cooling slots minimize cooling loses or degradation of the film layer and therefore provides a more effective film cooling for film development and maintenance.

The submerged metering diffusion slot creates additional local volume for the expansion of the downdraft hot core gas air, slows down the secondary flow as well as the velocity and pressure gradients, and thus weakens the horseshoe vortex and minimizes the high heat transfer coefficient created due to the horseshoe vortex.

The multiple metering and impingement diffusion film cooling slots extends the cooling air continuously and back side impingement cooling along the interface of the airfoil leading edge versus endwall location and therefore minimizes thermally induced stress by eliminating the discrete cooling holes which are separated by the non-cooled area characteristic of the prior art cooling design.

I claim the following:

1. A turbine stator vane comprising:

an airfoil extending between an inner diameter endwall and an outer diameter endwall;

a fillet formed between the airfoil and each of the two endwalls, the fillet extending around a leading edge of the airfoil and extending along a pressure side wall and a suction side wall toward the trailing edge;

a row of cooling air exit slots formed below the fillet and extending around a leading edge region of the airfoil and along the pressure side and the suction side of the airfoil;

a metering holes opening into each of the cooling air exit slots to supply cooling air; and, the exit slots opening onto a surface of the endwall such that cooling air is discharged substantially parallel to the surface of the endwall to produce a layer of film cooling air on the endwall surface.

2. The turbine stator vane of claim 1, and further comprising:

the row of exit slots each includes an impingement section and a diffusion section downstream from the impingement section.

3. The turbine stator vane of claim 1, and further comprising:

the metering holes open into the exit slots so that impingement cooling of the impingement section is produced.

4. The turbine stator vane of claim 3, and further comprising:

the metering holes open into the impingement section at a location below the fillet.

5. The turbine stator vane of claim 1, and further comprising:

a showerhead arrangement of film cooling holes located on a leading edge region of the airfoil and directed to discharge cooling air toward the fillet in the leading edge region.

6. The turbine stator vane of claim 1, and further comprising:

the row of exit slots forms a step from the fillet to the endwall surface.

7. A process for cooling a stator vane of a gas turbine engine, the stator vane having an airfoil section with a leading edge region and a fillet forming a transition from the airfoil section to an endwall, the process comprising the steps of:

cooling an inner section of the fillet by directing impingement cooling air to a surface underneath the fillet;

diffusing the impingement cooling air;

discharging the film cooling air from a diffusion slot parallel to a hot gas flow flowing over the fillet; and, discharging the diffused cooling air onto a surface of the endwall to form a layer of film cooling air over the endwall in a leading edge region of the endwall and along the pressure side and the suction side of the endwall.

8. The process for cooling a stator vane of claim 7, and further comprising the step of:

discharging a layer of film cooling air from the leading edge region of the airfoil that forms a second layer of film cooling air over the layer of film cooling air from the diffusion step.

9. A turbine stator vane comprising:

an airfoil extending from an endwall;

a fillet forming a transition between the airfoil and the endwall;

the fillet ending with a step on the endwall;

a diffusion exit slot opening onto the step of the fillet;

a diffusion chamber formed under the fillet and connected to the diffusion exit slot; and, a metering hole to supply cooling air to the diffusion chamber in a direction such that impingement cooling occurs within the diffusion chamber.

10. The turbine stator vane of claim 9, and further comprising:

a discharge direction of the diffusion exit slot and a hot gas flow passing over the fillet surface are parallel.

11. The turbine stator vane of claim 9, and further comprising:

the metering hole opens into the diffusion chamber at a location below the fillet.

* * * * *